(12) United States Patent
Ross et al.

(10) Patent No.: US 8,573,932 B2
(45) Date of Patent: Nov. 5, 2013

(54) COMPRESSOR BLADE ROOT HEATING SYSTEM

(75) Inventors: Christopher W. Ross, Oviedo, FL (US); Keith A. Miller, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 664 days.

(21) Appl. No.: 12/852,720

(22) Filed: Aug. 9, 2010

(65) Prior Publication Data

US 2012/0034081 A1    Feb. 9, 2012

(51) Int. Cl.
*F01D 25/10* (2006.01)
(52) U.S. Cl.
USPC ............................................................ 415/177
(58) Field of Classification Search
USPC ............ 415/1, 134, 175, 232, 10, 179; 416/1, 416/95, 248; 60/782, 784, 785
See application file for complete search history.

(56) References Cited

U.S. PATENT DOCUMENTS 2,547,934 A  *  4/1951  Gill .............................. 415/232

\* cited by examiner

*Primary Examiner* — Nathaniel Wiehe
*Assistant Examiner* — Kayla McCaffrey

(57) ABSTRACT

The compressor blade root heating system may be formed from one or more induction heaters formed from one or more induction coils positioned in close proximity to a root of a compressor blade. In one embodiment, the induction heater may be coupled to a static casing component positioned immediately upstream of a first row of compressor blades on a rotor assembly such that the induction heater is stationary during turbine engine operation. The induction heater causes eddy current formation, which heats the row one compressor blades. This heating increases the fracture toughness of the material forming the rotor and compressor blades, thereby increasing the mechanical life cycle.

17 Claims, 1 Drawing Sheet

COMPRESSOR BLADE ROOT HEATING SYSTEM

FIELD OF THE INVENTION

This invention is directed generally to turbine engines, and more particularly to heating systems in turbine engines.

BACKGROUND

Typically, gas turbine engines include a compressor for compressing air, a combustor for mixing the compressed air with fuel and igniting the mixture, and a turbine blade assembly for producing power.

Typically, gas turbine engines start at ambient temperatures, which at times can be cold, such as five degrees Celsius or below. Cold ambient temperatures can negatively affect the material properties of the compressor rotor, limiting the cyclic life of these components. Typically, the row one compressor disk is most affected by cold ambient temperatures since there is no heating of the gas path prior to the stage. Attempts have been made to increase the life spans of the compressor components by limiting the start temperatures to higher ambient temperatures, by applying more expensive blade materials to reduce blade mass or introduce more expensive disk materials to improve fracture toughness, by applying use of inlet heaters to raise the temperature of the inlet air, by overspeeding rotation of the rotor to introduce residual compressive stresses, and by combinations of these actions. Nonetheless, an efficient and cost effective system is still needed.

SUMMARY OF THE INVENTION

This invention relates to a compressor blade root heating system for a turbine engine. The compressor blade root heating system may be formed from one or more induction heaters formed from one or more induction coils positioned in close proximity to a root of a compressor blade. In one embodiment, the induction heater may be coupled to a static casing component positioned immediately upstream or downstream of a first row of compressor blades on a rotor assembly such that the induction heater is stationary during turbine engine operation. The roots of each blade passes by the induction heater as the rotor assembly rotates. The induction heater causes eddy current formation, which heats the row one compressor blades and rotor disc attachment. This heating increases the fracture toughness of the material forming the rotor disc attachment for the compressor blades, thereby increasing the mechanical life cycle without the cost and performance impact of a conventional inlet air heater or operation restrictions related to ambient temperature.

The turbine engine may include one or more combustors positioned downstream from a compressor rotor assembly that is positioned within a compressor. The turbine engine may also include a first row of compressor blades attached to the compressor rotor assembly, wherein the compressor blades may each extend radially outward and terminate proximate to inner surfaces of one or more ring segments. The compressor blade may include a root extending radially inward from a platform on the compressor blade, wherein the root may be configured to attach the compressor blade to the rotor assembly. The turbine engine may include an induction heater in close proximity to the root of the compressor blade. In at least one embodiment, the compressor blade root heating system may include a plurality of induction heaters.

The induction heater may be stationary during turbine engine operation in which the rotor assembly rotates. The induction heater may be attached to a static casing component positioned immediately upstream of the first row of compressor blades. In another embodiment, the induction heater may include a plurality of induction heaters coupled to the static casing component. The induction heater may be formed from one or more induction coils.

The induction heater may be controlled by controlling the amount of power supplied to the induction heater. The heater may be activated before the turbine engine is started to preheat the compressor blade, including the root and rotor disc attachment. If the rotor is stationary, it may be necessary to apply alternating frequency current to the electromagnets of the induction heater to cause eddy current formation in the rotor assembly prior to engine start. However, if the rotor is rotating due to turning gear operation, application of direct current to the electromagnets of the induction heater may be sufficient to cause eddy current formation in the rotor assembly prior to engine start. Increasing the temperature of the material forming the rotor assembly disc increases the fracture toughness of rotor material. Consequently, the mechanical cyclic life is increased.

An advantage of this invention is that the compressor blade root heating system may effectively increase cyclic life of the turbine airfoil rotor without the cost and negative performance characteristics associated with a conventional inlet air heater limiting the start temperatures to higher ambient temperatures, by applying more expensive blade materials to reduce blade mass or introduce more expensive disk materials to improve fracture toughness, by applying use of inlet heaters to raise the temperature of the inlet air, by overspeeding rotation of the rotor to introduce residual compressive stresses, or operation restrictions related to ambient temperature.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
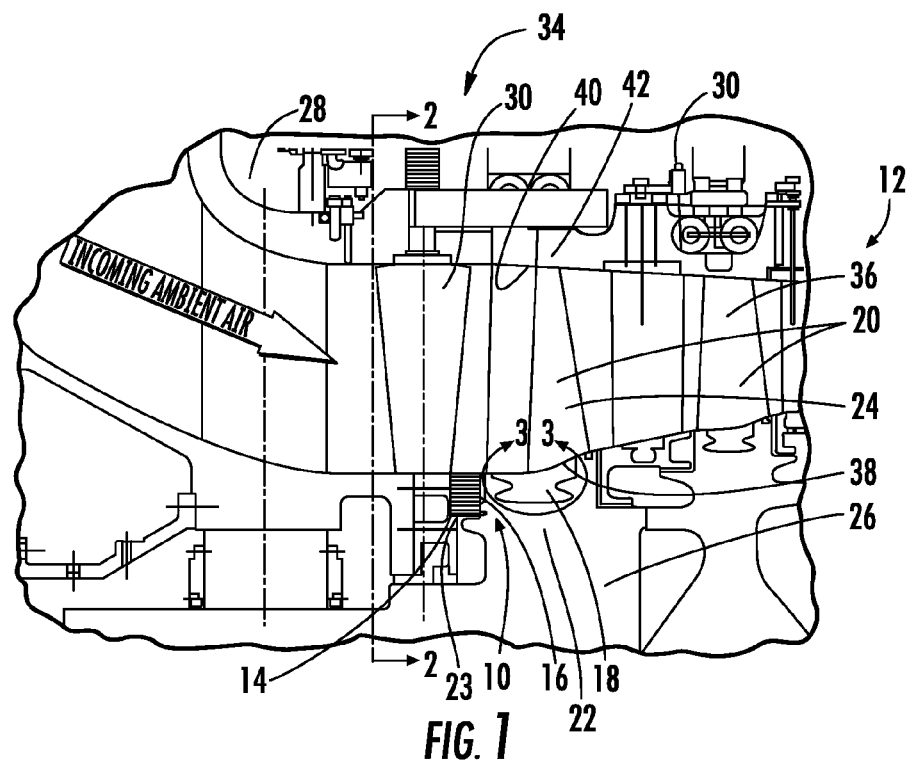
FIG. 1 is a cross-sectional side view of a portion of the turbine engine.
Figure 2:
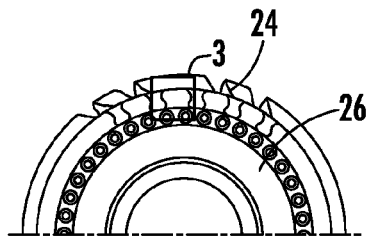
FIG. 2 is an axial view of a portion of the first row of compressor blades attached to the rotor assembly at detail line 2-2 in FIG. 1.
Figure 3:
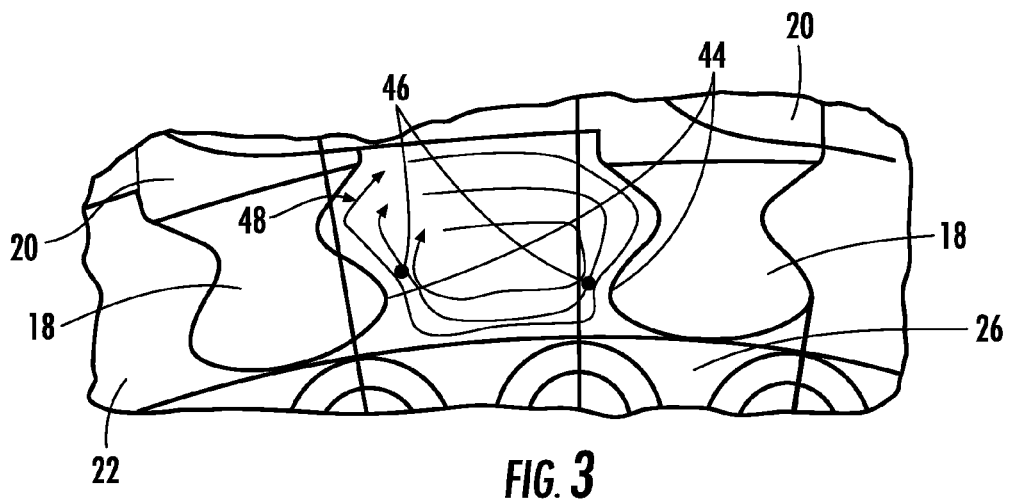
FIG. 3 is a detailed view of a portion of the turbine engine shown at detail 3 in FIG. 2.

As shown in FIGS. 1-3, this invention is directed to a compressor blade root heating system 10 for a turbine engine 12. The compressor blade root heating system 10 may be formed from one or more induction heaters 14 formed from one or more induction coils 16 positioned in close proximity to a root 18 of a compressor blade 20. In one embodiment, the induction heater 14 may be coupled to a static casing component 23 positioned immediately upstream of a first row 24 of compressor blades 20 on a rotor assembly 26 such that the induction heater 14 is stationary during turbine engine operation. The induction heater 14 causes eddy current 48 formation, which heats the rotor disc attachment 22 of the row one compressor blades 20. This heating increases the fracture toughness of the material forming the rotor disc attachment 22, thereby increasing the mechanical life cycle without the cost and performance impact of an inlet air heater, by applying more expensive blade materials to reduce blade mass or introduce more expensive disk materials to improve fracture toughness, by applying use of inlet heaters to raise the temperature of the inlet air, by overspeeding rotation of the rotor to introduce residual compressive stresses, or operation restrictions related to ambient temperature.

In at least one embodiment, as shown in FIG. 1, the turbine engine 12 may include a rotor assembly 26 positioned radially inward from a vane carrier 28 and the compressor vanes 30. The rotor assembly 26 may include a first row 24 and a second row 36 of compressor blades 20 extending radially outward from the rotor assembly 26 and terminating proximate to inner surfaces 40 of one or more ring segments 42. As shown in FIG. 1, the compressor blades 20 may be assembled into a plurality of rows, which are also referred to as stages, in addition to the first and second rows 24, 36. The compressor blades 20 may have any appropriate configuration and may be at least partially formed from an appropriate metal.

The turbine engine 12 may also include one or more combustors positioned downstream from the compressor rotor assembly 26. The compressor rotor assembly 26 may be contained within the compressor 34. The rotor assembly 26 may be configured to enable the rotor assembly 26 to rotate relative to the vane carrier 28, compressor vanes 30 and the static casing component 23 positioned upstream from the row one 24 compressor blades 20.

The compressor blade root heating system 10 may include one or more induction heaters 14 positioned in close proximity to the root 18 of the compressor blade 20 to create eddy currents 48 therein. The induction heater 14 may be stationary during turbine engine operation in which the rotor assembly 26 rotates. In at least one embodiment, the induction heater 14 may be attached to the static casing component 23 positioned immediately upstream of the first row 24 of compressor blades 20. In other embodiments, the induction heater 14 may be attached to other structures. In one embodiment, the compressor blade root heating system 10 may include a plurality of induction heaters 14 coupled to the static casing component 23.

The induction heater 14 may be formed from at least one induction coil 16. The induction coil 16 may be configured to produce heating in the root 18 of the compressor blade 20, which is formed at least partially of metal, by electromagnetic induction in which eddy currents 48 are generated within the metal and by resistance in the metal that causes Joule heating of the material. The induction heater 14 may include an electromagnet through which a high-frequency alternating current or direct current is passed. The frequency of the alternating current that is used depends on numerous factors, including, but not limited to: rotor rotation speed, ambient temperature, the penetration depth, type of material forming the rotor disc attachment 22, the size of the object, and how that induction coil 16 is coupled to the object to be heated.

The compressor blade root heating system 10 may also include a method of heating the rotor disc attachment 22. The method may include providing a turbine engine 12 having the elements set forth above, including, but not limited to one or more combustors, a compressor 34, a first row 24 of compressor blades 20 attached to a rotor assembly 26 positioned in the compressor 34, one or more blades 20 including a root 18 extending radially inward from a platform 38 on the compressor blade 20, wherein the root 18 may be configured to attach to the compressor blade 20 on the rotor assembly 26, and one or more induction heaters 14 in close proximity to the root 18 of the compressor blade 20. The method of may further include generating a magnetic field with the induction heater 14. The degree of heating of the rotor disc attachment 22 may be controlled by controlling the amount of power provided to the induction heater 14, such as by controlling the amount of eddy current 48 created by the induction heater 14.

The induction heater 14 may create a magnetic field in the region of the compressor blade attachment, such as the root 18. The magnetic field may cause eddy electrical currents 48 to be generated in the metallic material of the blade root 18 and compressor disk. The rotation of the rotor assembly 26 in this magnetic field may help induce the eddy current production. This electrical current may cause a rise in the metal temperature due to the electrical resistance of the material. Eddy currents tend to concentrate near geometric concentrations 44. As shown in FIG. 3, the location of stress concentration in the root 18 which limits the fracture mechanic critical crack size and thus limiting cyclic life or minimum starting temperature is shown at 44. The location of maximum heating from the induction heater 14 is at points 46 due to crowding (high density) of eddy-currents 48. Thus, the heating effect is concentrated at the same locations which have the limiting fracture mechanic critical size and thus limiting cyclic life or minimum starting temperature. Preheating the rotor disc attachment 22 enables the critical crack size to be increased, thereby enabling the corresponding fracture mechanic cyclic life to be increased.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine engine formed from a compressor including a rotor assembly, the turbine engine comprising:
    a row of compressor blades attached to the rotor assembly, wherein the compressor blades each extend radially outward, wherein at least one compressor blade includes a root extending radially inward from a platform on the compressor blade, the root configured to attach the at least one compressor blade to the rotor assembly;
    at least one induction heater in close proximity to the root of the at least one compressor blade; and
    wherein the at least one induction heater is stationary during turbine engine operation in which the rotor assembly rotates.

2. The turbine engine of claim 1, wherein the at least one induction heater is attached to a static casing component positioned immediately upstream of the row of compressor blades.

3. The turbine engine of claim 2, wherein the at least one induction heater comprises a plurality of induction heaters coupled to the static casing component.

4. The turbine engine of claim 1, wherein the at least one induction heater is formed from at least one induction coil.

5. A turbine engine formed from a compressor including a rotor assembly, the turbine engine comprising:
    a row of compressor blades attached to the rotor assembly, wherein the compressor blades each extend radially outward, wherein at least one compressor blade includes a root extending radially inward from a platform on the compressor blade, the root configured to attach the at least one compressor blade to the rotor assembly;
    at least one induction heater in close proximity to the root of the at least one compressor blade; and wherein the at least one induction heater comprises a plurality of induction heaters coupled to a static casing component.

6. The turbine engine of claim 5, wherein the at least one induction heater is attached to the static casing component, which is positioned immediately upstream of the row of compressor blades.

7. The turbine engine of claim 5, wherein the at least one induction heater is formed from at least one induction coil.

8. A turbine engine formed from a compressor including a rotor assembly, the turbine engine comprising:
   a row of compressor blades attached to the rotor assembly, wherein the compressor blades each extend radially outward, wherein at least one compressor blade includes a root extending radially inward from a platform on the compressor blade, the root configured to attach the at least one compressor blade to the rotor assembly;
   at least one induction heater formed from at least one induction coil positioned in close proximity to the root of the at least one compressor blade and coupled to a static casing component positioned immediately upstream of the row of compressor blades such that the at least one induction coil is stationary during turbine engine operation.

9. The turbine engine of claim 8, wherein the at least one induction heater comprises a plurality of induction heaters coupled to the static casing component.

10. A method of heating a compressor blade of a turbine engine, comprising:
    providing a turbine engine formed from a compressor including a rotor assembly, the turbine engine comprising:
      a row of compressor blades attached to the rotor assembly, wherein the compressor blades each extend radially outward, wherein at least one compressor blade includes a root extending radially inward from a platform on the compressor blade, the root configured to attach the at least one compressor blade to the rotor assembly;
      at least one induction heater in close proximity to the root of the at least one compressor blade; and
      generating a magnetic field with the at least one induction heater; and
      wherein providing a turbine engine comprises providing a turbine engine wherein the at least one induction heater is stationary during turbine engine operation in which the rotor assembly rotates.

11. The method of claim 10, wherein further comprising rotating the rotor assembly to assist in eddy current production.

12. The method of claim 10, wherein providing a turbine engine comprises providing a turbine engine wherein the at least one induction heater is attached to a static casing component positioned immediately upstream of the row of compressor blades.

13. The method of claim 12, wherein providing a turbine engine comprises providing a turbine engine wherein the at least one induction heater comprises a plurality of induction heaters coupled to the static casing component.

14. The method of claim 10, wherein providing a turbine engine comprises providing a turbine engine wherein the at least one induction heater is formed from at least one induction coil.

15. A method of heating a compressor blade of a turbine engine, comprising:
    providing a turbine engine formed from a compressor including a rotor assembly, the turbine engine comprising:
      a row of compressor blades attached to the rotor assembly, wherein the compressor blades each extend radially outward, wherein at least one compressor blade includes a root extending radially inward from a platform on the compressor blade, the root configured to attach the at least one compressor blade to the rotor assembly;
      at least one induction heater in close proximity to the root of the at least one compressor blade; and
      generating a magnetic field with the at least one induction heater; and
      wherein providing a turbine engine comprises providing a turbine engine wherein the at least one induction heater comprises a plurality of induction heaters coupled to a static casing component.

16. The turbine engine of claim 15, wherein the at least one induction heater is attached to the static casing component, which is positioned immediately upstream of the row of compressor blades.

17. The turbine engine of claim 15, wherein the at least one induction heater is formed from at least one induction coil.

* * * * *